United States Patent [19]

Sugihara

[11] 4,276,334

[45] Jun. 30, 1981

[54] PRESSURE SENSITIVE RECORDING SHEET

[75] Inventor: Tetsuo Sugihara, Nara, Japan

[73] Assignee: General Company Limited, Tokyo, Japan

[21] Appl. No.: 963,747

[22] Filed: Nov. 27, 1978

Related U.S. Application Data

[63] Continuation of Ser. No. 736,536, Oct. 28, 1976, abandoned, which is a continuation of Ser. No. 589,877, Jun. 24, 1975, abandoned.

[30] Foreign Application Priority Data

| | | | |
|---|---|---|---|
| Oct. 31, 1974 | [JP] | Japan | 49/124589 |
| Jan. 31, 1975 | [JP] | Japan | 50/12421 |
| Jan. 31, 1975 | [JP] | Japan | 50/12422 |

[51] Int. Cl.[3] ................................................ G11B 5/62

[52] U.S. Cl. .................................. 428/40; 346/77 E; 346/77 R; 346/135.1; 428/354; 428/422; 428/908; 428/913; 346/76 R;77 R;77 E;135.1;136;137;138

[58] Field of Search ................. 428/908, 913, 40, 510, 428/571, 516, 517, 519, 520, 522, 354, 422; 40/2.2; 264/176 R, 127; 156/244

[56] References Cited

U.S. PATENT DOCUMENTS

| | | | |
|---|---|---|---|
| 3,389,201 | 6/1968 | Alsup et al. | 264/127 |
| 3,542,630 | 11/1970 | Pfiffner | 40/2 |
| 3,692,759 | 9/1972 | Ocone | 264/127 |
| 3,753,841 | 8/1973 | Whaler | 40/2 |
| 3,884,505 | 5/1975 | Miller | 282/27.5 |
| 3,887,734 | 6/1975 | Chazan | 428/913 |
| 3,900,658 | 8/1975 | Fujii et al. | 428/422 |
| 3,953,566 | 4/1976 | Gore | 264/127 |

FOREIGN PATENT DOCUMENTS

| | | | |
|---|---|---|---|
| 47-17457 | of 1972 | Japan | 264/127 |

*Primary Examiner*—Stanley S. Silverman

*Attorney, Agent, or Firm*—Fitzpatrick, Cella, Harper & Scinto

[57] ABSTRACT

A pressure sensitive member comprises a base sheet and an opaque pressure clarifiable layer overlying the substrate and the color of the substrate being different from that of the opaque clarifiable layer.

9 Claims, 19 Drawing Figures

PRESSURE SENSITIVE RECORDING SHEET

This is a continuation of application Ser. No. 736,536, filed Oct. 28, 1976, now abandoned, which is a continuation of application Ser. No. 589,877, filed June 24, 1975, now abandoned.

BACKGROUND OF THE INVENTION

1. Field of the Invention

This invention relates to a pressure sensitive recording sheet.

2. Description of the Prior Art

There have been heretofore known inscribable labels. The simplest ones are those made of paper, but are of very poor water resistance and can not be used outdoors or in water. Another type of inscribable label is composed of a colored plastic base sheet, a crystalline wax coated thereon and a transparent film overlying the crystalline wax coat and the inscription can be effected from the transparent film side. However, this label has poor heat and light resistances and is not suitable for a long time use outdoors. A further conventional inscribable label is a so-called "embossing tape" composed of a colored backing sheet and a transparent film overlying the backing sheet which becomes whitened when subjected to deformation by a punch-die. The embossing tape has an excellent circumstance resistance. However, the inscription can not be made by a usual stylus or ball-point pen, but only by a special tool such as a punch-die.

SUMMARY OF THE INVENTION

According to one aspect of the present invention, there is provided a pressure sensitive recording sheet which comprises an opaque pressure clarifiable layer and a support sheet under the opaque pressure clarifiable layer, the support sheet having a color contrasting with the color of the opaque pressure clarifiable layer.

According to another aspect of the present invention, there is provided a pressure sensitive recording sheet which comprises the layer structure as mentioned above and additionally a transparent protective layer is provided on the opaque pressure clarifiable layer.

According to a further aspect of the present invention, there is provided a pressure sensitive recording sheet which comprises an opaque pressure clarifiable layer, a transparent support sheet under the opaque pressure clarifiable layer, and a colored adhesive layer under the transparent support sheet, and if desired, a transparent protective layer is provided on the opaque pressure clarifiable layer.

An object of the present invention is to provide a pressure sensitive recording sheet having excellent heat resistance, light resistance and water resistance, free from formation of crack and capable of being inscribed with a usual writing instrument.

Another object of the present invention is to provide a pressure sensitive recording sheet which can be easily produced.

DESCRIPTION OF THE PREFERRED EMBODIMENTS

Figure 1A:
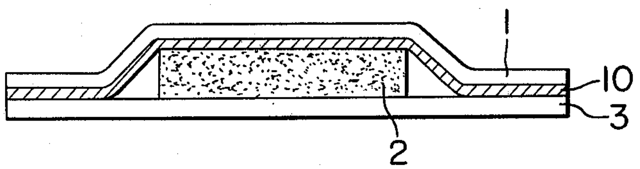
FIG. 1A and FIGS. 2–FIG. 18 diagrammatically show enlarged cross sectional views of embodiments of the pressure sensitive recording sheet according to the present invention.

Support sheets used for the present invention may be flexible or non-flexible materials and transparent or opaque depending upon the use. Further, the shape is not critical, but usually such forms as thin sheets, foils and films are preferable.

Representative support sheets include papers such as kraft paper and the like, plastic films such as acetylcellulose, polypropylene, polyethylene, polyester, and soft or hard polyvinyl chloride films and the like, and metal foils such as aluminum foil, copper foil and the like.

Opaque pressure clarifiable layers used in the present invention are layers which are opaque at an ordinary state and transparentize when a pressure is applied to them. These materials transparentize when a pressure such as that of a writing instrument and that of typewriter printing heads is applied to them.

Representative materials for the opaque pressure clarifiable layers are polyfluoroethylenes such as polytetrafluoroethylene and the like, and polyethylene such as low pressure process polyethylene and the like. There is preferably used unbaked polytetrafluoroethylene. This is a polytetrafluoroethylene as shaped by a paste extruding method and not followed by a heating treatment.

The transparent protective layer used in the present invention may be a transparent sheet, for example, film, which can transfer pressure patterns applied thereto to the opaque pressure clarifiable layer under the transparent protective layer and can protect the opaque pressure clarifiable layer from, for example, dirt, scratching and other damages. The transparent protective layer may serve for controlling the pressure sensitivity of the pressure sensitive recording sheet.

Representative materials for the transparent protective layer include thin transparent acetylcellulose, polypropylene, polyethylene, polyester, and soft or hard polyvinyl chloride films.

The pressure sensitive recording sheet comprising an opaque pressure clarifiable layer, a support sheet and, if desired, a transparent protective layer being provided on the opaque pressure clarifiable layer according to the present invention may have an adhesive layer under the support sheet, or both of an adhesive layer under the support sheet and a release treated layer on the top of the pressure sensitive recording sheet, that is, on the opaque pressure clarifiable layer when no transparent protective layer is mounted thereon, or on the transparent protective layer. Further if desired, a release layer may be provided under the adhesive layer. When the release layer is provided under the adhesive layer, the release treated layer on the top of the pressure sensitive recording sheet is usually unnecessary.

As the adhesive layers, there may be used usual adhesive materials such as, for example, pressure sensitive adhesives and water soluble adhesives. Representative pressure sensitive adhesive layers may be produced by dissolving rubbers such as neoprene, vinyl resins such as polyvinyl chloride, high polymers of cellulose series such as ethyl cellulose, together with a adhesivity imparting agent such as D.O.P., dammar and the like, in a solvent such as, for example, solvent naphtha, applying to the support sheet, and drying.

The release treated layer may be produced by conventional method for producing a release coat, for example, applying a coating liquid containing a silicone resin, a reaction accelerator and a solvent and drying.

The release layer may be a layer of a conventional release agent or a release layer formed on a certain sheet, for example, a release paper produced by applying a coating solution composed of a silicone resin, a reaction accelerator and a solvent to a paper and drying. For example, the surface coated with the release agent is placed on the adhesive surface of the adhesive layer.

According to the present invention, it is very important that the layers of the pressure sensitive recording sheet are combined in such a manner that the appearance of the opaque pressure clarifiable layer is different from the appearance of the portions transparentized by applying a pressure. The difference of appearance may be difference of color, shade of color and other visual properties of the surface states.

For example, in case of a pressure sensitive recording sheet composed of an adhesive layer, an opaque colored support sheet, an opaque pressure clarifiable layer and a colorless transparent release treated layer, when the color of the opaque pressure clarifiable layer and that of the opaque colored support sheet are different from each other. The color appearing at the transparentized portion is that of the opaque colored support sheet. When the transparentized portion of the opaque pressure clarifiable layer is not colorless, but colored-transparent, the color appearing at the transparentized portion is a mixed color of the opaque colored support sheet and the color of the transparentized portion of the opaque pressure clarifiable layer. Further, when there is a transparent protective layer or a release treated layer or there are both a transparent protective layer and a release treated layer and they are colored-transparent, the color appearing at the transparentized portion is a mixed color of them, and the color appearing a untransparentized portion of the opaque pressure clarifiable layer is a mixed color of color or colors of the layers overlying the opaque pressure clarifiable layer and color of the opaque pressure clarifiable layer. Further, if adhesives used for bonding those layers are colored-transparent, the resulting appearing color is a mixed color formed by adding the color or colors of the adhesive or adhesives.

In view of the foregoing, it is very important to select the color of each layer in such a manner that the color appearing at the transparentized portion of the opaque pressure clarifiable layer is different from the color appearing at the untransparentized portion.

The above explanation is directed to the difference of color only, but it will be easily realized that any kind of visual difference is usable according to the present invention.

In general, a pressure sensitive recording sheet comprising a colorless transparent protective layer, an opaque pressure clarifiable layer and an opaque support sheet having a color different from that of the opaque pressure clarifiable layer, particularly a color well contrasting with that of the opaque pressure clarifiable layer, is preferable. The contrast of colors may be optionally selected depending upon the use of the recording sheet, for example, beautiful sense, warning, and usual indication.

Sizes and shapes of layers constituting the pressure sensitive recording sheet may be different from each other and may be selected optionally depending upon the use of the recording sheet. Various combinations of the sizes and shapes are illustrated in the drawing though they are not limited to the illustrated ones.

Figure 4:
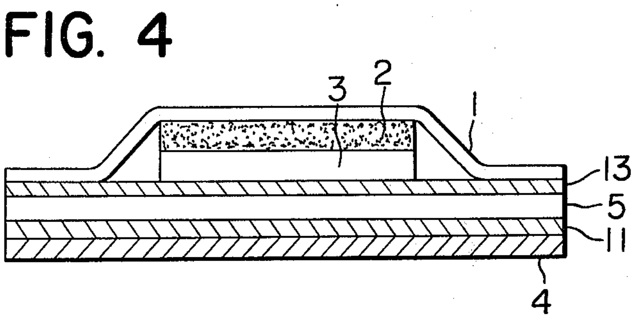
Figure 5:
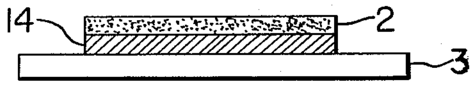

In FIGS. 6, 7, 16, 17, etc., each layer has the same size and shape. In FIGS. 1A, 1B, 2, 3, etc., the transparent protective layer and the support sheet have the same size and shape. In FIG. 4 etc., the opaque pressure clarifiable layer and the support sheet have the same size and shape. In FIG. 5 etc., shape and size of the opaque pressure clarifiable layer is different from those of the support sheet. In FIGS. 1A, 1B, 2, 3, 4, 5, 10, 13, 15 and 18, the width of the opaque pressure clarifiable layer is narrower than other layers such as the support sheet. In these cases, the center portion (the opaque pressure clarifiable layer) can have a color different from that of the both edge portions. Thus it is possible to select two colors of excellent and beautiful contrast. Since it is possible to make the color appearing at the transparentized portion the same as that of the edge portion so that the color appearing at the transparentized portion can be predicted by the color of the edge portion. Furthermore, it is possible to classify the articles to which the pressure sensitive recording sheet is to be adhered, by the colors of the edge portions.

The layers and sheets constituting the pressure sensitive recording sheet may be assembled in any way depending upon its use as far as each layer or sheet is not separated away. The layers and sheets may be assembled by using adhesives or fusing or sealing. The layers and sheets can be assembled not only by assembling each layer and sheet separately prepared, but also can be produced by directly coating one or more of them.

Upon assembling it should be avoid to disturb or deteriorate the function of the recording sheet. For example, it is not allowable to use an opaque adhesive between the transparent protective layer and the opaque pressure clarifiable layer.

For the purpose of adhering the pressure sensitive recording sheet to an article though the recording sheet may be used without adhering to an article, various adhering means may be employed. For example, an adhesive layer is provided under the support sheet.

The pressure sensitive recording sheet may be commercially in a various forms such as tape type, sheet type and the like. The one of the tape type can be wound and sold in a form of a roll. When the top layer of pressure sensitive recording sheet has a release property, the roll in case of tape type having an adhesive layer can be made without using any release layer or applying a releasing treatment, end the sheet type ones can be piled without using any release sheet except a release layer for the bottom one. When the adhesive layer is made of a water soluble adhesive, in usual a release layer or sheet is not necessary.

One of preferable embodiments of the present invention is a pressure sensitive recording sheet comprising a transparent support sheet and a colored adhseive layer having a color contrasting with the color of the opaque pressure clarifiable layer.

The colored adhesive layer may be a colored pressure sensitive adhesive layer composed of a coloring agent such as benzidine yellow, phthatocyanine blue, phthalocyanine green, soluble azo dye, chromium oxide, zinc oxide and the like, and an adhesive composition, for example, rubber series ahdesives such as neoprene and the like, vinyl series adhesives such as polyvinyl chloride and the like, cellulosic high polymers such as ethyl-cellulose and the like together with an adhesiveness imparting agent such as dammar, D.O.P. and the like. The colored adhesive layer composition may be applied to the transparent support sheet by dissolving the composition in a solvent such as solvent naphtha and the like. Further, a colored water soluble adhesive layer may be employed. The colored adhesive layer may be transparent or not.

Referring to FIG. 1A, an opaque pressure clarifiable layer 2 is interposed between a transparent protective layer 1 and a support sheet 3 and transparent protective layer 1 is adhered to opaque pressure clarifiable layer 2 and support sheet 3 with an adhesive 10.

Figure 1B:
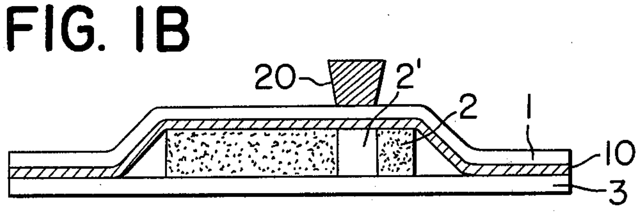
FIG. 1B diagrammatically shows that an inscription to a pressure sensitive recording sheet of the present invention.

Referring to FIG. 1B, a pressure is applied to the pressure sensitive recording sheet of FIG. 1A by a stylus 20 and the pressed portion 2′ of opaque pressure clarifiable layer 2 is transparentized. Thus the surface of support sheet 3 corresponding to the portion 2′ can be seen through the portion 2′ and this is the recording Referring to FIG. 2, an adhesive layer 11 is applied to the support sheet 3 of the recording sheet of FIG. 1A and further a release paper 4 is applied to adhesive layer 11. Upon using, release paper 4 is removed and the recording sheet is applied to a surface of article.

Figure 3:
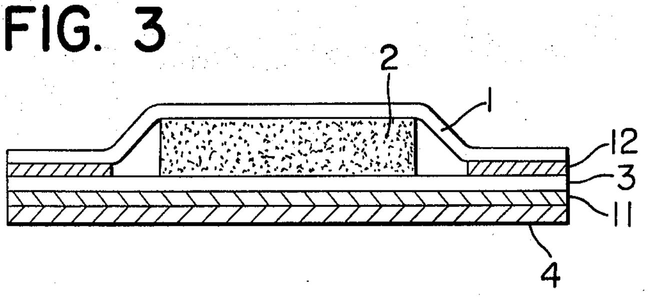

Referring to FIG. 3, an opaque pressure clarifiable layer 2 is interposed between a transparent protective layer 1 and a support sheet 3 and the both edge portions of transparent protective layer 1 and support sheet 3 are adhered to each other, and an adhesive layer 11 and a release paper 4 are provided.

Referring to FIG. 4, a transparent protective layer 1, an opaque pressure clarifiable layer 2 and a support sheet 3 are closely contacted with one another and fixed to another support sheet 5 by using an adhesive agent 13 through the edge portions of transparent protective layer 1 and the bottom side of opaque pressure clarifiable layer 2, and a combination of an adhesive layer 11 and a release paper 4 is provided on the back surface of support sheet 5. According to this pressure sensitive recording sheet, the color of support sheet 5 can be different from colors of opaque pressure clarifiable layer 2 and support sheet 3 and thereby, when letters of signs are inscribed in the recording sheet, the color of the inscribed letters or signs is that of support sheet 3 and the color adjacent to the letters or signs is that of opaque pressure clarifiable layer 2 and the color at the both edge portions is that of support sheet 5 and thus, there is obtained a beautiful three color label.

Figure 2:
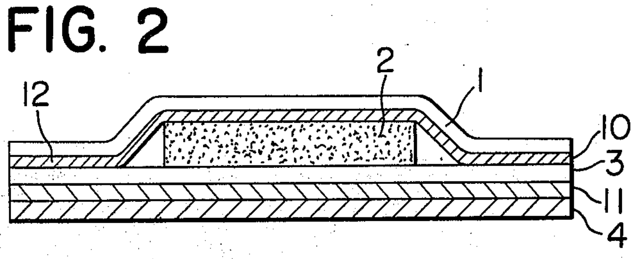

Referring to FIG. 5, the pressure sensitive recording sheet is composed of an opaque clarifiable layer 2 adhered to a support sheet 3 by an adhesive agent 14. On the bottom side of support sheet 3 may be provided adhesive layer 11 and release layer 4 as shown in FIG. 2. When an opaque pressure clarifiable layer 2 is not covered with any protective layer as in this embodiment, it is preferable to use an opaque pressure clarifiable layer somewhat thicker than that covered with a protective layer, and further it is preferred that the opaque pressure clarifiable layer can sufficiently withstand external physical or chemical action.

Figure 6:
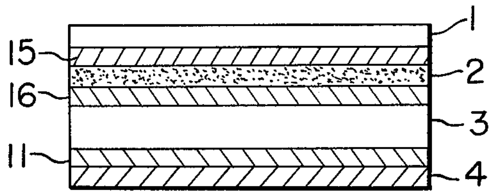

Referring to FIG. 6, the pressure sensitive recording sheet is composed of a transparent protective layer 1, an opaque pressure clarifiable layer 2, and support sheet 3 which are assembled by using adhesive layers 15 and 16, and further an adhesive layer 11 and release layer 4. The width of each layer is the same as each other.

Figure 7:
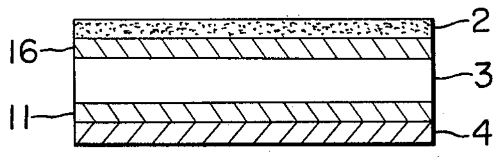

Referring to FIG. 7, the recording sheet is the same as that of FIG. 6 except that there are not the transparent protective layer and thereby the adhesive layer 15 and the opaque pressure clarifiable layer 2 is exposed and inscription is directly made on the opaque pressure clarifiable layer 2.

Figure 8:
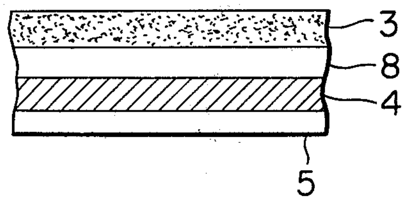

Referring to FIG. 8, the pressure sensitive layer is composed of an opaque pressure clarifiable layer 3 adhered to a transparent support sheet 4 with an adhesive layer 8, and a colored adhesive layer 5 under the transparent support sheet 4.

Figure 9:
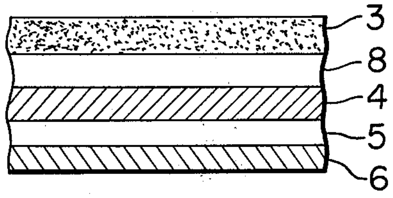

Referring to FIG. 9, the recording sheet is the same as that of FIG. 8 except that a release layer 6 is provided. Upon using, release layer 6 is removed and the recording sheet is adhered to an article with the adhesive layer 5.

Figure 10:
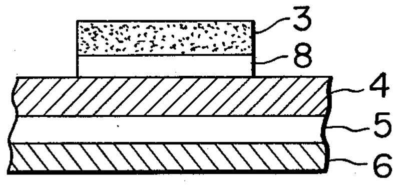

Referring to FIG. 10, the pressure sensitive recording sheet has the same structure as that of FIG. 9 except that the width of opaque pressure clarifiable layer 3 and therefore that of adhesive layer 8 is narrower than other layers. On the upper side, there appear a color zone of the layer 3 at the center portion and color zones of the colored adhesive layer 5 at both edge portions when the transparent support sheet is colorless or color zones of a mixed color of the transparent support sheet 4 and the color adhesive layer 5 when the transparent support sheet is colored. Thus, the appearance is beautiful. Upon using, the release lyer 6 is removed and the recording sheet is adhered to an article.

Figure 11:
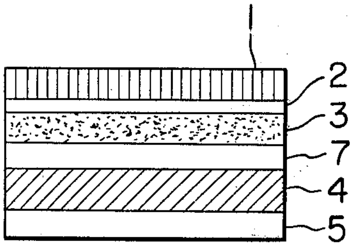

Referring to FIG. 11, the pressure sensitive recording sheet is composed of a transparent protective layer 1, an adhesive layer 2, an opaque pressure clarifiable layer 3, an adhesive layer 7, a transparent support sheet 4 and a colored adhesive layer 5.

Figure 12:
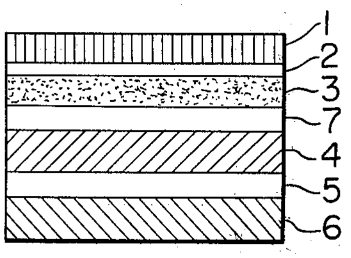

Referring to FIG. 12, the recording sheet is the same as that of FIG. 11 except that a release layer 6 is provided under the colored adhesive layer 5. The release layer 6 is removed upon using and the recording sheet is adhered to an article.

Figure 13:
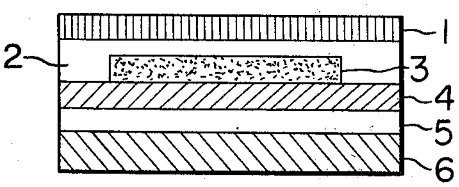

Referring to FIG. 13 the layer structure of the pressure sensitive recording sheet is the same as that of FIG. 12 except that width of the opaque pressure clarifiable layer is narrower than other layers and the adhesive layer 7 is not necessary. The appearance of this recording sheet is beautiful in a similar way to that of FIG. 10.

The recording sheets as mentioned above having a release sheet are suitable for use as sheet type products.

Figure 14:
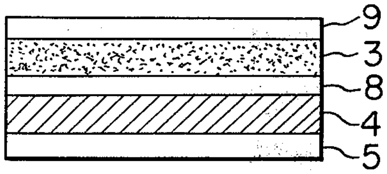

Referring to FIG. 14, the pressure sensitive recording sheet is composed of a release treated layer 9, an opaque pressure clarifiable layer 3, an adhesive layer 8, a transparent support sheet 4 and a colored adhesive layer 5. This kind of recording sheet is suitable for use as roll type products by winding the recording sheet in a form of tape.

Figure 15:
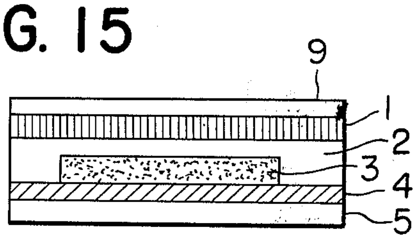

Referring to FIG. 15, the pressure sensitive recording sheet is composed of a release treated layer 9, a transparent protective layer 1, an adhesive layer 2, an opaque pressure clarifiable layer 3, a transparent support layer 4 and a colored adhesive layer 5 where the width of opaque pressure clarifiable layer 3 is narrower than that of other layers. The appearance of this recording sheet is similar to that of FIG. 10. This is suitable for roll type products. Naturally, the recording sheets of FIG. 14 and FIG. 15 may be piled without any additional releasing means so that they can be also used as a kind of sheet type product.

Figure 16:
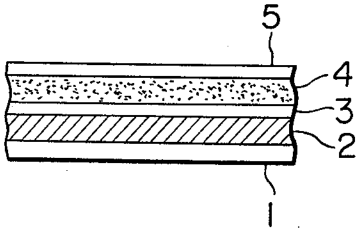

Referring to FIG. 16, the pressure sensitive recording sheet is composed of a release treated layer 5, an opaque pressure clarifiable layer 4, an adhesive layer 3, an opaque colored support sheet 2 and an adhesive layer 1, and is suitable for roll type products.

Figure 17:
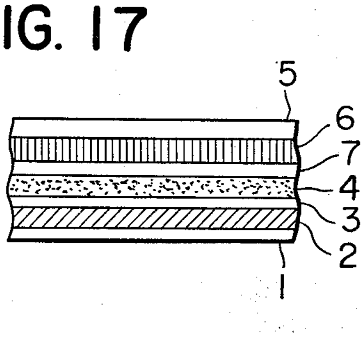

Referring to FIG. 17, this pressure sensitive recording sheet is the same as that of FIG. 16 except that a transparent protective layer 6 and an adhesive layer 7 are additionally provided. The release treated layer 5 may be formed on the transparent protective layer 6 by treating the surface of the layer 6.

Figure 18:
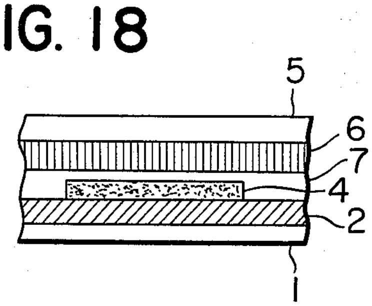

Referring to FIG. 18, the pressure sensitive recording sheet is the same as that of FIG. 17 except that the width of opaque pressure clarifiable layer 4 is narrower than other layers and thereby the adhesive layer 3 is omitted. A two-color recording sheet is obtained.

In a similar way, the recording sheet of FIG. 16 can be a two-color recording sheet by using a narrower opaque pressure clarifiable layer 3. In such case, the edge portions of the release treated layer 5 is provided directly on the opaque colored support sheet 2.

I claim:

1. A pressure sensitive recording sheet consisting of a single opaque pressure clarifiable layer composed only of non-porous unbaked polytetrafluoroethylene, a support sheet under said pressure clarifiable layer, and a layer of adhesive disposed between said pressure clarifiable layer and said support sheet, either one of said layer of adhesive or said support sheet having a color contrasting with the color of said pressure clarifiable layer.

2. A pressure sensitive recording sheet according to claim 1, wherein a transparent protective layer is provided on the opaque pressure clarifiable layer.

3. A pressure sensitive recording sheet according to claim 1 or 2, wherein a second adhesive layer is disposed under said support sheet and a release layer is disposed under said second adhesive layer.

4. A pressure sensitive recording sheet according to claim 1, wherein said layer of adhesive has a color contrasting with the color of said pressure clarifiable layer.

5. A pressure sensitive recording sheet according to claim 1, wherein said adhesive is transparent and said support sheet has a color contrasting with the color of said pressure clarifiable layer.

6. A pressure sensitive recording sheet consisting of a single opaque pressure clarifiable layer composed only of non-porous unbaked polytetrafluoroethylene, a support sheet under said pressure clarifiable layer, and a layer of adhesive disposed under said support sheet, either one of said layer of adhesive or said support sheet having a color contrasting with the color of said pressure clarifiable layer.

7. A pressure sensitive recording sheet according to claim 6 wherein said support sheet is transparent and said layer of adhesive has a color contrasting with the color of said pressure clarifiable layer.

8. A pressure sensitive recording sheet according to claim 6 wherein said support sheet has a color contrasting with that of said pressure clarifiable layer.

9. A pressure sensitive recording sheet according to claim 6, wherein a transparent protective layer is provided on the opaque pressure clarifiable layer.

* * * * *

UNITED STATES PATENT AND TRADEMARK OFFICE

CERTIFICATE OF CORRECTION

PATENT NO. : 4,276,334

DATED : June 30, 1981

INVENTOR(S) : TETSUO SUGIHARA

It is certified that error appears in the above—identified patent and that said Letters Patent is hereby corrected as shown below:

Column 2, line 1, after "shows", delete "that".

Column 4, line 34, "avoid" should be --avoided--; line 51, "end" should read --and--; line 63 "phthatocyanine" should read --phthalocyanine--.

Column 6, line 26, "lyer" should read --layer--.

Signed and Sealed this

*Twenty-second* Day of *September 1981*

[SEAL]

*Attest:*

GERALD J. MOSSINGHOFF

*Attesting Officer* *Commissioner of Patents and Trademarks*